(12) United States Patent
Wang et al.

(10) Patent No.: US 8,871,821 B2
(45) Date of Patent: Oct. 28, 2014

(54) GRAPHENE AND GRAPHENE OXIDE AEROGELS

(75) Inventors: Jian Wang, Fremont, CA (US); Mark W. Ellsworth, Dublin, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 865 days.

(21) Appl. No.: 12/315,701

(22) Filed: Dec. 4, 2008

(65) Prior Publication Data

US 2010/0144904 A1   Jun. 10, 2010

(51) Int. Cl.
| | | |
|---|---|---|
| B01J 13/00 | (2006.01) | |
| C08J 3/00 | (2006.01) | |
| C01B 31/04 | (2006.01) | |
| B82Y 30/00 | (2011.01) | |
| B82Y 40/00 | (2011.01) | |

(52) U.S. Cl.
CPC ........... *C01B 31/043* (2013.01); *C01B 31/0438* (2013.01); *B82Y 30/00* (2013.01); *C01B 31/0484* (2013.01); *C01B 31/0476* (2013.01); *C01B 31/0423* (2013.01); *B82Y 40/00* (2013.01)
USPC .......................................................... 516/98

(58) Field of Classification Search
USPC .......................................................... 516/98
See application file for complete search history.

(56) References Cited

U.S. PATENT DOCUMENTS

| | | | |
|---|---|---|---|
| 5,601,938 A | 2/1997 | Mayer et al. | |
| 2002/0038864 A1 | 4/2002 | Hirohata et al. | |
| 2007/0131915 A1* | 6/2007 | Stankovich et al. | 252/511 |
| 2007/0259169 A1 | 11/2007 | Williams et al. | |
| 2010/0008021 A1 | 1/2010 | Hu et al. | |

FOREIGN PATENT DOCUMENTS

| | | | | |
|---|---|---|---|---|
| FR | 2512441 A | 3/1983 | | |
| JP | 2001-261439 A | 9/2001 | | |
| JP | 2003-238131 A | 8/2003 | | |
| JP | 2004-210583 A | 7/2004 | | |
| JP | 2005-063951 | * 3/2005 | ............... | H01B 1/24 5/12 |
| JP | 2005-063951 A | 3/2005 | | |
| JP | 2008-231258 A | 10/2008 | | |
| JP | 2009-538813 A | 11/2009 | | |

OTHER PUBLICATIONS

Bourlinos et al. ("Synthesis, characterization and gas sorption properties of a molecularly-derived graphite oxide-like foam", Carbon 45 (2007) 852-857, Available online Dec. 18, 2006).*

Mateusz et al. ("Carbon Nanotube Aerogels", Wiley, Adv. Mater. 2007, 19, 661-664, Published online Feb. 1, 2007).*

Lawrence W. Hrubesh and John F. Poco, "Thin Aerogel Films for Optical, Thermal, Acoustic, and Electronic Applications", Lawrence Livermore National Laboratory, International Symposium on Aerogels, 1994, Berkeley, California.

Clark Vaught, "Carbon Aerogel Really Cleans Up Water", Materials Technologies, 1998 Technology Applications Report, pp. 56 & 57.

Joseph C. Farmer, Tri D. Tran, et al., "The Application of Carbon Aerogel Electrodes to Desalination & Waste Treatment", Lawrence Livermore National Laboratory, Annual Meeting of the American Institute of Chemical Engineers, Aug. 1, 1997.

A. Kovalenko and F. Hirata, "Molecular description of electrolyte solution in a carbon aerogel electrode", Condensed Matter Physics, 2003, vol. 6, No. 4(36), pp. 583-609.

Ruowen Fu, Bo Zheng, et al., "Studies of the Chemical and Pore Structures of the Carbon Aerogels Synthesized by Gelation and Supercritical Drying in Isopropanol", Journal of Applied Polymer Science, 2004, vol. 91, pp. 3060-3067.

Theodore F. Baumann and Julie L. Herberg, "IV.C.1d Metal-Doped Carbon Aerogels for Hydrogen Storage", FY 2006 Annual Progress Report, DOE Hydrogen Program, pp. 457-458.

J. Phalippou, T. Woignier, R. Sempere et al., "Highly porous aerogels of very low permeability", Materials Science, 2002, vol. 20, No. 1, pp. 29-42.

J.F. Poco, P.R. Coronado, R.W. Pekala and L.W. Hrubesh, "A Rapid Supercritical Extraction Process for the Production of Silica Aerogels", Lawrence Livermore National Laboratory, Materials Research Society 1996 Spring Meeting, San Francisco, California.

International Search Report for International Application No. PCT/US2009/006359, mailed Mar. 3, 2010.

S.M. Mukhopadhyay et al., "Structural Investigation of Graphitic Foam", *Journal of Applied Physics*, vol. 91, No. 5, pp. 3415-3420, Mar. 1, 2002.

M. B. Bryning et al, Carbon Nanotube Aerogels, Advanced Materials, vol. 19, pp. 661-667 (2007).

D. Long et al, Chemical State of Nitrogen in Carbon Aerogels Issued from Phenol-Melamine-Formaldehyde Gels, Carbon, vol. 46, pp. 1259-1262 (2008).

M. S. Dresselhaus, Future Directions In Carbon Science, Annu. Rev. Mater. Sci, vol. 27, pp. 1-34 (1997).

* cited by examiner

*Primary Examiner* — Ling Choi
*Assistant Examiner* — Chun-Cheng Wang

(57) ABSTRACT

A carbon-based aerogel is disclosed in which the carbon atoms are arranged in a sheet-like nanostructure. The aerogel may be either a graphene oxide aerogel or a graphene aerogel and may further be reinforced with a polymer. A method for making the aerogel is also disclosed and includes providing graphite oxide, creating a dispersion of the graphite oxide in a liquid, and drying the dispersion to form a graphene oxide aerogel. In one embodiment, the graphene oxide aerogel is thermally treated to convert the graphene oxide to graphene.

9 Claims, 6 Drawing Sheets

GRAPHENE AND GRAPHENE OXIDE AEROGELS

FIELD

This application is directed to aerogels and more particularly to carbon aerogels.

BACKGROUND

Aerogels are a composition of matter having an open cell foam structure with high surface areas and ultrafine pore and cell sizes. One commonly known aerogel is silica aerogel which consists of bonded silicon and oxygen atoms joined into long strands and then into beads randomly linked together with pockets of air between them. Silica aerogels are among the lowest density solids known and possess many potentially useful properties. However, the high production cost associated with making silica aerogels limits wide-range commercial applications, which are currently limited generally to high value military and aerospace projects.

Another type of aerogel is carbon-based aerogel, which is composed of tenuous networks of clustered carbon nanoparticles. Carbon aerogels possess some similar properties to silica aerogels, but tend to have a superior mechanical integrity. Carbon aerogels are also electrically conductive with a conductivity depending on the density and are also extremely absorptive in the infrared spectrum, reflecting only 0.3% of radiation between 250 nm and 14.3 μm. In addition, because the solid conducts heat only through narrow chains of atoms, thermal conductivity of carbon aerogels can be as low as, or lower than, that of air.

These properties of carbon aerogels lend it to numerous industrial applications including desalination, thermal and/or acoustic insulation, solar energy collection, catalyst support, and others.

Graphene is a one-atom-thick planar sheet of sp2-bonded carbon atoms that are densely packed in a honeycomb crystal lattice. Graphene is a two dimensional building material for carbon materials of all other dimensionalities. It can be wrapped up into 0D buckyballs, rolled into 1D nanotubes or stacked into 3D graphite. Graphene has excellent in-plane mechanical, structural, thermal, and electrical properties similar to carbon nanotubes.

It would be desirable, therefore, to provide a carbon-based aerogel that is a graphene, but which heretofore has not been done.

SUMMARY

The inventors have now created, for the first time, carbon aerogels in which the carbon atoms in the aerogel are arranged into a sheet-like nanostructure.

In one embodiment, the aerogel is a graphene aerogel; in another embodiment the aerogel is a graphene oxide aerogel. In still another embodiment the carbon based aerogels having a sheet-like nanostructure are reinforced with a polymer.

According to another embodiment of the invention, a method for making a carbon-based aerogel in which the carbon atoms are arranged into a sheet-like nanostructure is disclosed. The method includes providing graphite oxide, creating a dispersion of the graphite oxide in a liquid, and drying the dispersion to form a graphene oxide aerogel. In one embodiment, the method further includes reducing the graphene oxide in the aerogel to graphene.

An advantage of certain embodiments is that carbon-based aerogels having a sheet-like nanocarbon structure provide a superior surface area-to-volume ratio over other carbon materials.

Another advantage is that graphene aerogels are strong and electrically conducting and can be even further strengthened by polymer reinforcement while still maintaining enhanced conductivity.

Other features and advantages of the present invention will be apparent from the following more detailed description of exemplary embodiments, taken in conjunction with the accompanying drawings which illustrate, by way of example, the principles of the invention.

DETAILED DESCRIPTION OF EXEMPLARY EMBODIMENTS

Figure 1A:
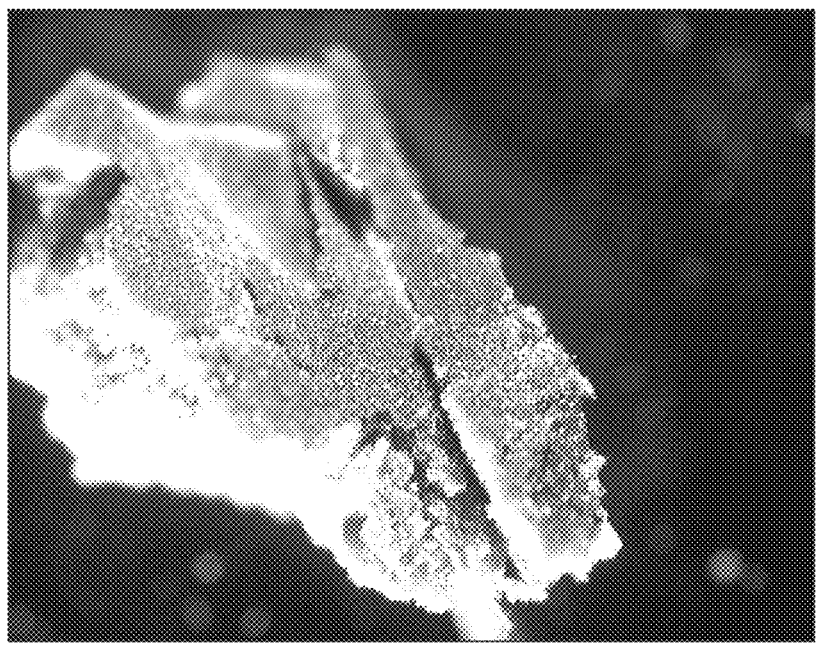
FIGS. 1A and B are a photograph and SEM image, respectively, of a graphene oxide aerogel according to an exemplary embodiment of the invention.

In accordance with exemplary embodiments of the invention, the inventors have developed carbon-based aerogels having a sheet-like nanostructure, including graphene oxide aerogels and graphene aerogels. The aerogels can be reinforced with polymers. The inventors have determined that such carbon-based aerogels having a sheet-like nanostructure are strong and electrically conducting, thereby offering potential improvement over current carbon aerogel technologies for a variety of applications, including sensors, thermoelectric devices, heat shields, conductive composites for EMI/FI shielding as well as electrochemical applications, such as porous electrodes for batteries, fuel cells, and supercapacitors, all by way of example only.

Preparation of these Compositions can be Accomplished Through the Formation of wet-gel precursors of graphite oxide, followed by drying. In accordance with one embodiment of the invention, graphite oxide by the oxidation of graphite flakes is prepared based on the Hummers' approach. The graphite oxide is then added to a liquid, preferably water, to create a dispersion. The solid content in the graphite oxide dispersion may range from about 1 mg/mL to about 20 mg/mL. Other suitable liquids include mixtures of water and alcohol. An organic liquid, such as THF, may also be used, but may require the use of one or more surfactants to achieve sufficient dispersion of the graphite oxide in the organic liquid.

In one embodiment, the graphite oxide is exfoliated in the liquid, for example, by ultrasonication. The dispersed graphite oxide swells in the liquid, which typically results in the formation of a gel. Gellation may be enhanced, for example, by increasing the solid content of graphite oxide in the dispersion, by driving off the liquid in the dispersion, or, in one embodiment, through the addition of one or more polymers soluble in the liquid used to create the dispersion.

The graphite oxide dispersion is then dried to produce a graphene oxide aerogel. Suitable drying techniques include freeze-drying and critical point drying.

The graphene oxide in the aerogel can then be reduced to graphene, such as through a thermal treatment process like vacuum heating or heating in an inert atmosphere, such as in argon or nitrogen, for example, or heating in a reducing atmosphere, such as forming gas. In any case, the temperature is generally held above 200° C. and typically for a period of at least three hours to convert the graphene oxide aerogels to graphene aerogels. Combustion analysis following thermal treatment at these conditions showed a conversion of at least about 80% graphene oxide to graphene. The time and temperature of the thermal treatment may be controlled to accomplish a predetermined level of conversion of graphene oxide to graphene, depending on the application. For example, in one embodiment a conversion as high as about 96% was achieved when thermal treatment was conducted at 800° C.

In one embodiment, the graphene oxide and graphene aerogels are reinforced with a polymer. The polymer may be any polymer that is soluble in the liquid used for the dispersion of the graphite oxide. In a presently preferred embodiment, a water soluble polymer, such as polyvinyl alcohol, is added to the graphite oxide and water dispersion prior to gellation.

The weight ratio of polymer to graphite oxide is typically in the range of between about 1:1 to about 5:1. Other ratios may be suitable depending on the application. During subsequent aerogel formation, the polymer infiltrates the pores of the aerogel, reinforcing the strength of the aerogel. Any thermal treatment of polymer infiltrated graphene oxide for reduction to graphene should be conducted under conditions that do not result in decomposition of the polymer compound, typically in the range of about 200 to 350° C.

EXAMPLES

The invention is further described by way of the following examples, which are presented by way of illustration, not of limitation.

Example 1

Using the Hummers' approach by oxidation of graphite flakes, 20 g of powdered flake graphite (SP-1 graphite, Bay Carbon, Mich.), 10 g of sodium nitrate, and 0.5 liters of sulfuric acid were mixed in a 3-liter glass jar that had been cooled in an ice-bath, forming a suspension. While maintaining vigorous agitation, 60 g of potassium permanganate was added, eventually forming a paste. The rate of potassium permanganate addition was controlled to prevent the temperature from exceeding 20° C.

The ice-bath was removed and the temperature of the paste-like suspension brought to 35±3° C., where it was maintained for 30 minutes. 1 liter of water was then slowly stirred into the suspension, causing violent effervescence and an increase in temperature to 98° C. The now-diluted suspension was maintained at this temperature for 15 minutes.

The suspension was then further diluted to approximately 3 liters with warm water and treated with 3% (by volume) hydrogen peroxide to reduce the residual permanganate and manganese dioxide, followed by filtering. The filter cake was washed three times with a total of 3 liters of warm water. The filter cake, containing graphite oxide residue, was dispersed in 6 liters of water to approximately 0.5% (by weight) solids. Dry graphite oxide was then obtained by centrifugation followed by dehydration in vacuum.

The dried graphite oxide was then added to deionized water to form a 2.5 mg/mL dispersion. Exfoliation was achieved by mild ultrasonication. This dispersion was then poured into a 200 mL flask and flash frozen in liquid nitrogen. The frozen dispersion was then subjected to overnight vacuum drying, resulting in a pristine graphene oxide aerogel as pictured in FIG. 1A and in the SEM image shown in FIG. 1B.

Figure 1B:
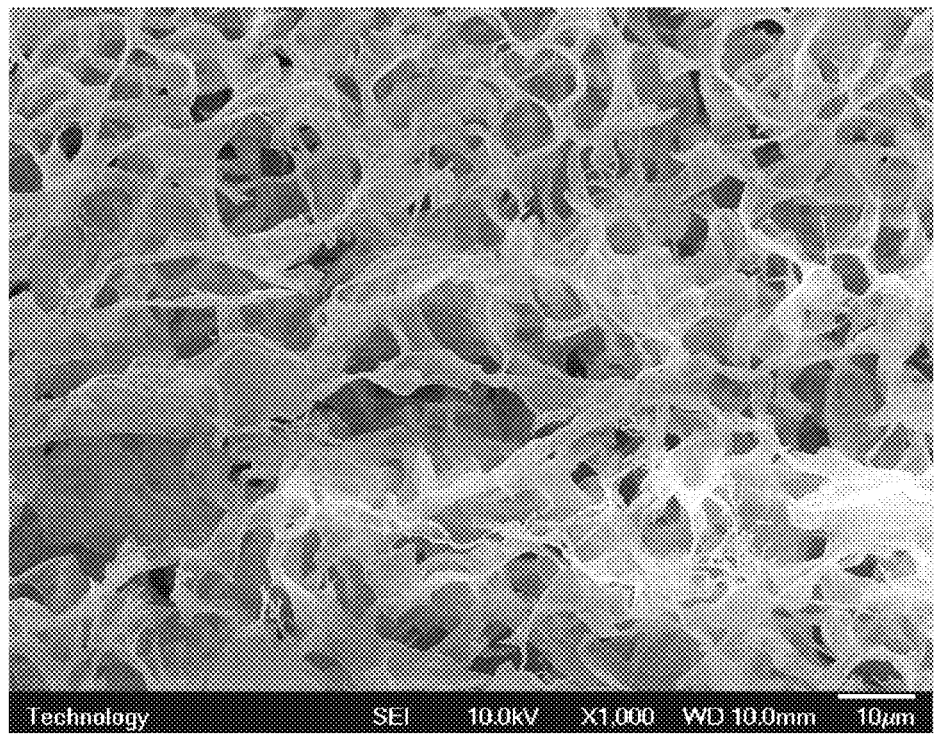

Results of the graphene oxide aerogel showed good mechanical integrity having a foam-like structure with a light yellow color. The SEM image of FIG. 1B shows a highly porous network of crumbled graphene oxide sheets. These sheets are translucent to electrons; the size of these sheets range from a few micrometers to several tens of micrometers. The graphene oxide aerogel was electrically semiconducting, with modest electron charging observed during SEM imaging. The graphene oxide aerogel had a relatively large pore size, in the range of a few tens of micrometers.

Example 2

A polymer reinforced graphene oxide aerogel was prepared in the same manner, except that a polyvinyl alcohol (PVA) water solution was added to the dispersion, having a 2.5 mg/ml solid content and in which the solid weight ratio of PVA to graphite oxide was 1:1.

Figure 2A:
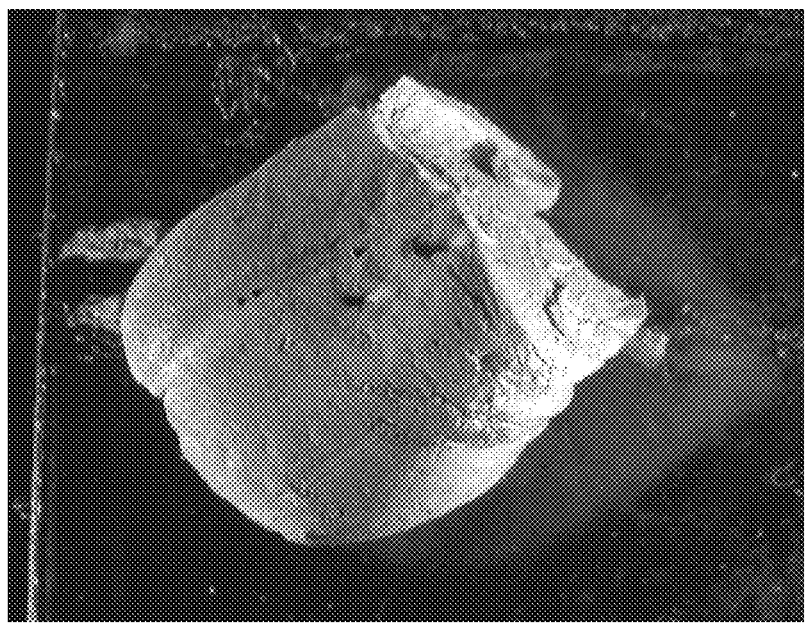
FIGS. 2A and B are a photograph and SEM image, respectively, of a polymer reinforced graphene oxide aerogel according to an exemplary embodiment of the invention.
Figure 2B:
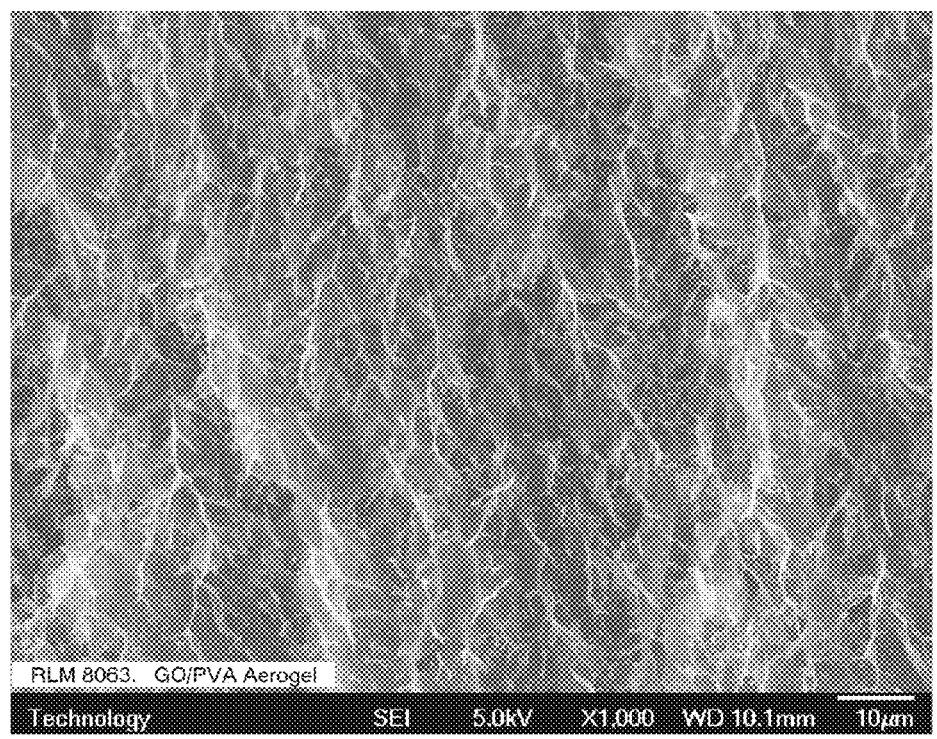

The resulting polymer-reinforced graphene oxide aerogel is pictured in FIG. 2A, with an SEM image shown at FIG. 2B.

Examples 3a and 3b

The graphene oxide aerogels produced in Examples 1 and 2 were thermally treated to reduce the graphene oxide aerogels to explore the ability of the graphene oxide aerogels to be reduced to graphene aerogels. The pristine and polymer-reinforced graphene oxide aerogels were thermally treated in an inert atmosphere of argon gas in which the temperature was slowly increased from room temperature to 300° C. and held at that temperature for ten hours.

The resulting thermally treated graphene oxide and polymer reinforced graphene oxide aerogels (and their corresponding SEM images) are pictured in FIGS. 3A-3B and FIGS. 4A-4B, respectively.

Figure 3A:
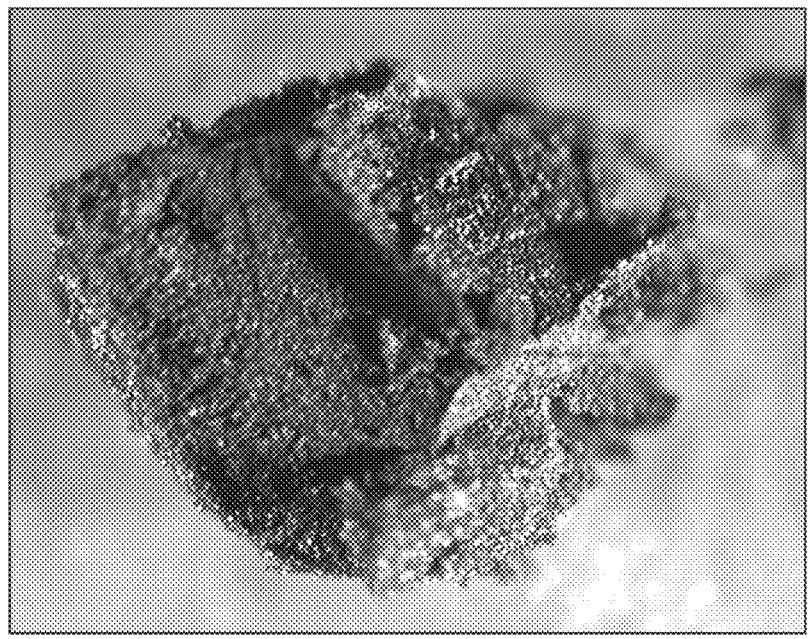
FIGS. 3A and B are a photograph and SEM image, respectively, of a thermally treated graphene oxide aerogel according to an exemplary embodiment of the invention.
Figure 3B:
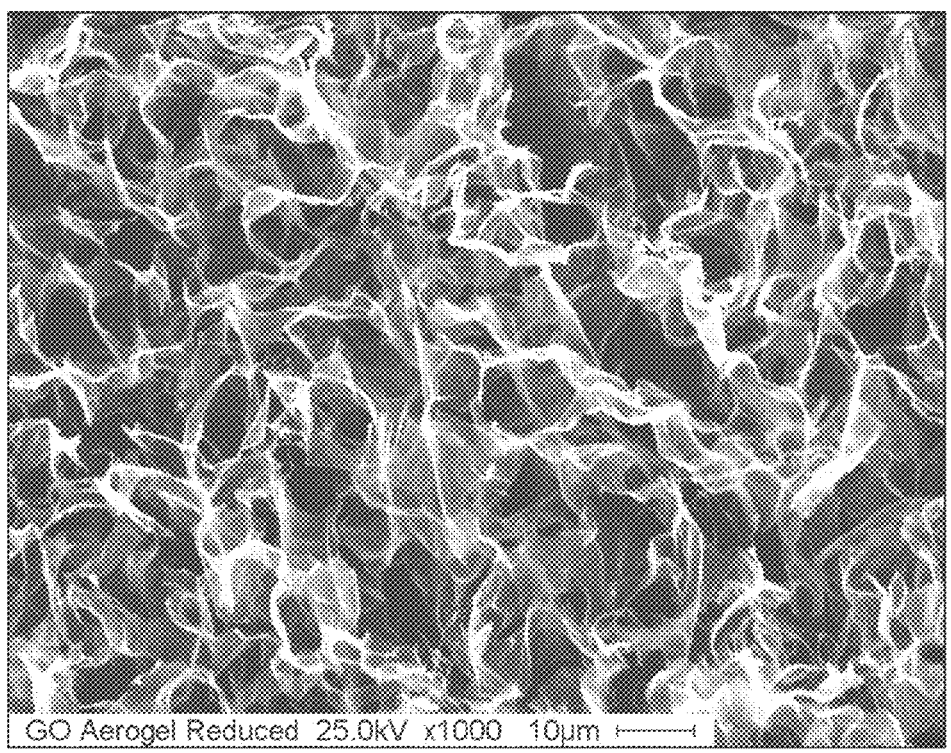
Figure 4A:
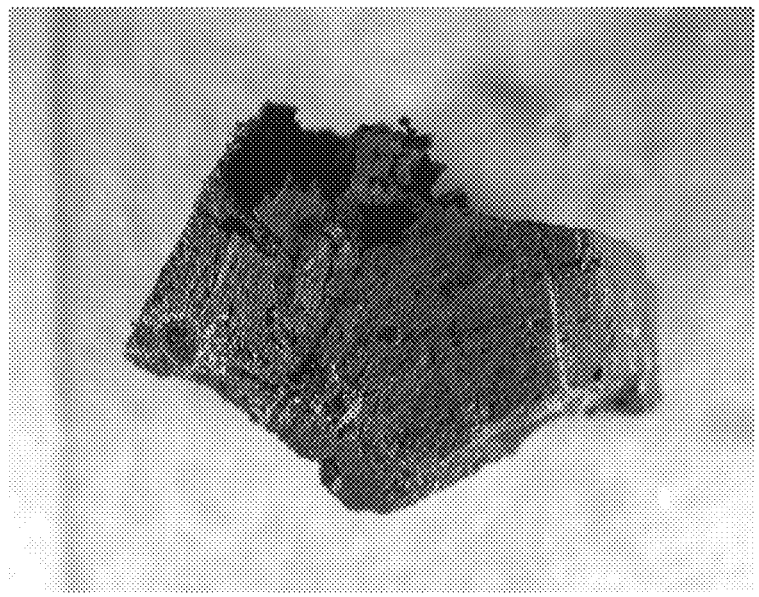
FIGS. 4A and B are a photograph and SEM image, respectively, of a thermally treated, polymer reinforced graphene oxide aerogel according to an exemplary embodiment of the invention.
Figure 4B:
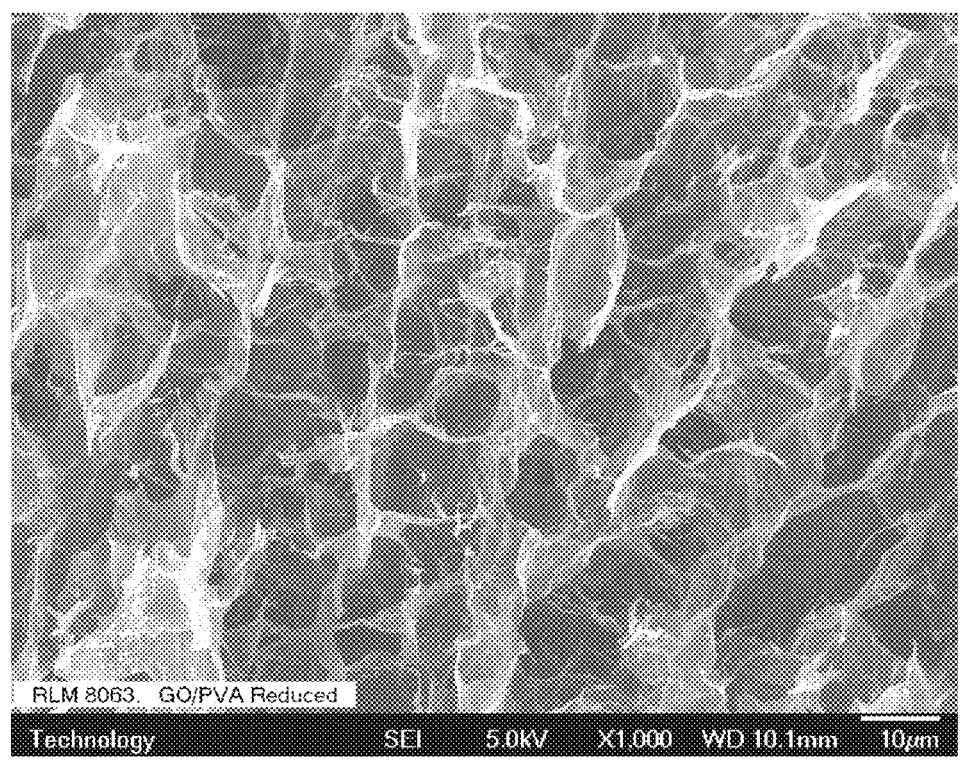

The thermally treated pristine graphene oxide aerogel, shown in FIGS. 3A and 3B, turned black after thermal treatment, but retained its porous carbon network, thus demonstrating that the graphene oxide could be reduced while restoring the conjugated graphene structure. This leads to enhanced electrical conductivity that was determined to be an increase of nearly six orders of magnitude over the graphene oxide, confirming the conversion of the graphene oxide aerogel to a graphene aerogel.

The SEM images of the graphene aerogels demonstrate that both also maintained an open, porous network (which was infiltrated with polymer in the reinforced embodiment) and subsequent study showed excellent electrical conductivity.

The polymer-reinforced graphene oxide aerogels also demonstrated enhanced strength, in which they were observed to support at least 5000 times their own weight.

Figure 5:
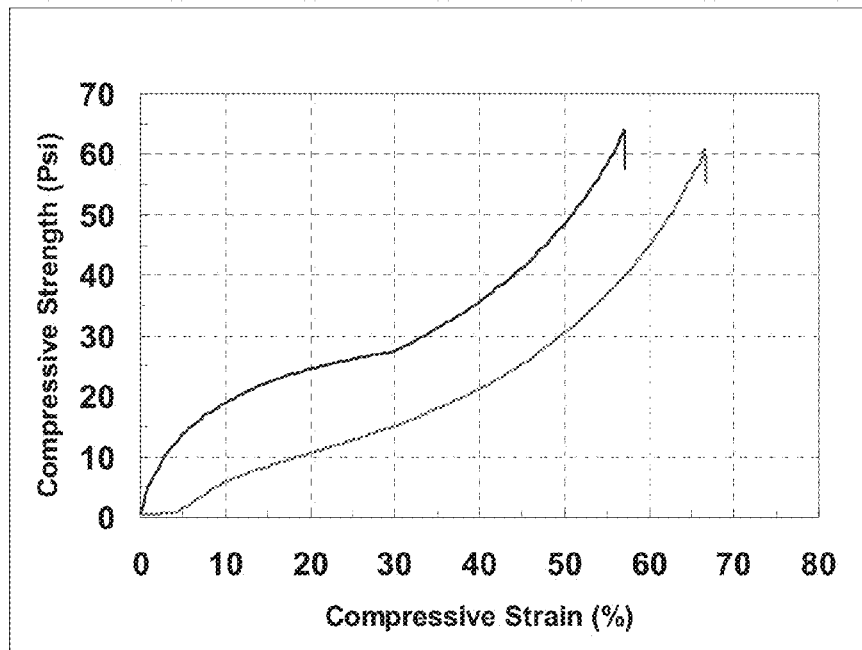
FIGS. 5-7 are graphs illustrating various results achieved with compositions in accordance with exemplary embodiments of the invention.

A quantitative study of the mechanical properties of polyvinylalcohol-reinforced graphene oxide aerogels is shown in FIG. 5. Several cylindrical pillar samples of this material were formed by carrying out the previously described aerogel formation process in a glass tube. The pillars were subjected to a compression test using a texture analyzer. Compressive strength was recorded versus strain. Based on these results, the compressive modulus was calculated in the range between 0.8 to 3 MPa at 2% strain.

Electrochemical studies were conducted on the thermally treated pristine and polymer reinforced graphene aerogels. Each of the aerogels was cut into one centimeter square pieces having a thickness of 2 millimeters that were then glued to a gold foil using carbon paste to form an electrode. The electrode was immersed into a three-cell electrochemical testing system using 1M $H_2SO_4$ or 1M KOH as electrolytes, platinum wire as a counter electrode and a silver/silver chloride electrode as a reference electrode. The AC impedance, cyclic voltammetry, charging and discharging measurements were performed using an electrochemical potentiostat and an impedance/gain—phase analyzer (Solartron Analytical, UK). Measurements noted below were carried out at room temperature (23° C.). In addition to gold, nickel, aluminum or other materials may also be provided as foil for use in forming a porous electrochemical electrode by attaching the graphene aerogel thereto.

Figure 6:
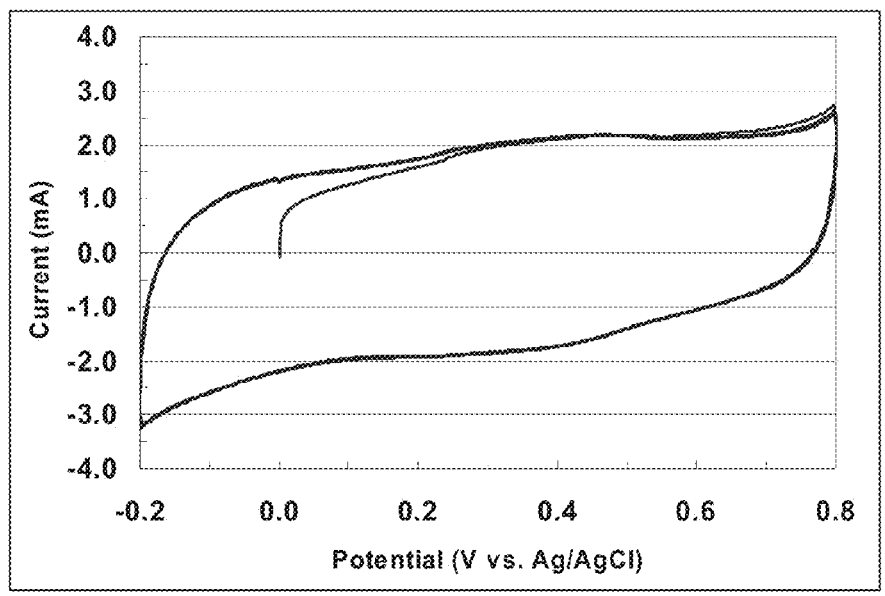

FIG. 6 shows a representative cyclic voltammogram of a graphene aerogel electrode in aqueous acidic electrolyte, which was created based on a scan rate of 20 mV/s using 1 M $H_2SO_4$ as the electrolyte. The cyclic voltammogram curve reveals no significant current peaks and is nearly symmetric with respect to the zero current line. This indicates the graphene electrode has characteristics of a capacitor, with constant charging and discharging rate. The specific capacitance was calculated between 70 to 90 F/g.

Figure 7:
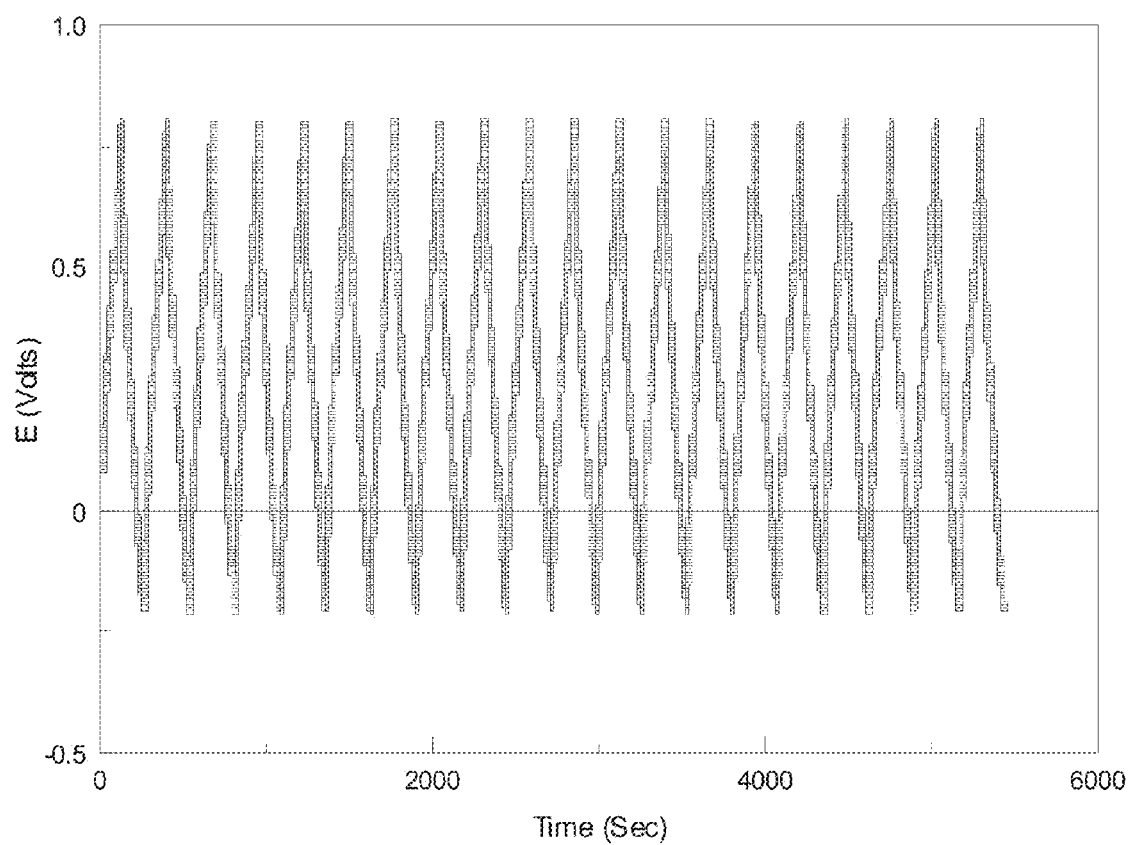

FIG. 7 shows representative charging and discharging curves for the graphene electrode between −0.2 V and 0.8 V versus silver/silver chloride, which was conducted at a current of 1 mA again using 1 M $H_2SO_4$ as the electrolyte. The curves are linear and exhibit little or no loss due to series resistance. The specific charge was calculated to be about 150 C/g.

The results of these electrochemical studies reveal the suitability of graphene aerogels as highly porous, electrically conductive electrode materials which may be used in a variety of energy storage and energy conversion applications, such as electrochemical double-layer capacitors and bipolar plates in fuel cells, by way of example only. The infiltration of the aerogels with a polymer may provide polymer/graphene nanocomposites for use in heat shields, EMI/RFI shielding, and other high strength, light weight applications.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A composition of matter comprising a dry carbon-based aerogel in which (i) the carbon atoms are arranged in a sheet-like nanostructure, and (ii) the carbon-based aerogel is a graphene aerogel reinforced with a water-soluble polymer, said polymer being polyvinyl alcohol.

2. A method for making a carbon-based aerogel in which the carbon atoms are arranged into a sheet-like nanostructure comprising:
providing graphite oxide;
creating a dispersion of the graphite oxide in a liquid;
adding a water soluble polymer to the graphite oxide dispersion in an amount in the range of about one part by weight to about five parts by weight with respect to the graphite oxide; and
drying the dispersion to form a graphene oxide aerogel.

3. The method of claim 2, further comprising reducing the graphene oxide to graphene.

4. The method of claim 3, wherein the step of reducing comprises heating the graphene oxide aerogel for at least three hours at a temperature of at least 200° C.

5. The method of claim 2, wherein the step of creating a dispersion comprises adding graphite oxide in an amount in the range of about 1 milligram to about 20 milligrams per milliliter of liquid.

6. The method of claim 2, wherein the step of creating a dispersion comprises creating a wet-gel dispersion.

7. The method of claim 2, wherein the step of drying comprises critical point drying the dispersion.

8. The method of claim 2, wherein the step of drying comprises freeze drying the dispersion.

9. The method of claim 2, wherein the step of creating a dispersion comprises exfoliating the graphite oxide in the liquid by ultrasonication.

* * * * *